US012330912B2

(12) United States Patent
Talonen

(10) Patent No.: US 12,330,912 B2
(45) Date of Patent: Jun. 17, 2025

(54) APRON DEVICE, ELEVATOR CAR AND METHOD FOR PROTECTING FROM FALLING INTO ELEVATOR SHAFT

(71) Applicant: Kone Corporation, Helsinki (FI)

(72) Inventor: Tapani Talonen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/749,067

(22) Filed: Jun. 20, 2024

(65) Prior Publication Data

US 2024/0336456 A1 Oct. 10, 2024

Related U.S. Application Data

(63) Continuation of application No. PCT/EP2022/051231, filed on Jan. 20, 2022.

(51) Int. Cl.
*B66B 13/28* (2006.01)
*B66B 11/02* (2006.01)

(52) U.S. Cl.
CPC ........ *B66B 13/285* (2013.01); *B66B 11/0226* (2013.01)

(58) Field of Classification Search
CPC .......................... B66B 13/285; B66B 11/0226
See application file for complete search history.

(56) References Cited

U.S. PATENT DOCUMENTS 5,655,628 A * 8/1997 Lin ....................... B66B 13/245 182/84
8,469,155 B2 * 6/2013 Thomsen .............. B66B 13/285 49/54
9,227,817 B2 * 1/2016 Fauconnet ............ B66B 13/285
11,161,716 B2 * 11/2021 Fauconnet ............ B66B 13/285
11,198,594 B2 * 12/2021 Beauchaud ........... B66B 13/285
2007/0181377 A1 * 8/2007 Ketonen ............... B66B 13/285 187/314
2009/0277725 A1 * 11/2009 Rasanen ............... B66B 13/285 187/400

(Continued)

FOREIGN PATENT DOCUMENTS

EP 2688826 A1 1/2014
EP 3608281 A1 2/2020
FI 118047 B 6/2007

OTHER PUBLICATIONS

International Search Report for International Application No. PCT/EP2022/051231 dated Sep. 2, 2022.

(Continued)

*Primary Examiner* — Michael A Riegelman
(74) *Attorney, Agent, or Firm* — Harness, Dickey & Pierce, P.L.C.

(57) ABSTRACT

An apron device, an elevator car and method of protecting falling into an elevator shaft. The apron device comprises a first protective element and a second protective element which are both located under a door sill of an elevator car. The elements form together a bending stiff sleeve structure which can move in relation to the elevator car. The first protective element can lift the second protective element being closer to the elevator car. When the second protective element is lifted, its upper part moves in transversal direction towards a space below a bottom of the elevator car. The first protective element is moved only in vertical direction.

15 Claims, 5 Drawing Sheets

(56) References Cited

U.S. PATENT DOCUMENTS

| | | | | |
|---|---|---|---|---|
| 2014/0008158 | A1* | 1/2014 | Fauconnet | B66B 13/285 187/400 |
| 2014/0020986 | A1* | 1/2014 | Delachatre | B66B 13/285 187/400 |
| 2014/0216860 | A1* | 8/2014 | Karimpanackal Natarajan | B66B 13/285 187/400 |
| 2017/0362064 | A1* | 12/2017 | Schroeder-Brumloop | B66B 1/28 |
| 2020/0039796 | A1* | 2/2020 | Beauchaud | B66B 11/0226 |
| 2024/0336456 | A1* | 10/2024 | Talonen | B66B 11/0226 |

OTHER PUBLICATIONS

Written Opinion for International Application No. PCT/EP2022/051231 dated Jan. 20, 2022.

* cited by examiner

APRON DEVICE, ELEVATOR CAR AND METHOD FOR PROTECTING FROM FALLING INTO ELEVATOR SHAFT

CROSS-REFERENCE TO RELATED APPLICATION

This application s a continuation of PCT International Application No. PCT/EP2022/051231 which has an International filing date of Jan. 20, 2022, the entire contents of which are incorporated herein by reference.

BACKGROUND OF THE INVENTION

The invention relates to an apron device of an elevator where an elevator pit is with limited depth.

The invention further relates to an elevator car provided with an apron device, and to a method for preventing falling into an elevator shaft.

The field of the invention is defined more specifically in the preambles of the independent claims.

An elevator comprises an elevator car which is moved vertically in an elevator shaft and is stopped at landings. The elevator car comprises a door opening which needs to be provided with an apron device for preventing passengers falling into the shaft in special situations when the elevator car is not stopped properly at the desired landing and when a gap is formed between a bottom of the elevator car and the landing. Safety regulations require the use of apron devices. Therefore, several different apron devices are designed for the purpose. However, the known solutions have shown to contain some disadvantages.

BRIEF DESCRIPTION OF THE INVENTION

An object of the invention is to provide a novel and improved apron device, and an elevator car provided with such apron device. A further object is to provide a new and improved method for preventing falling into an elevator shaft.

The apron device according to the invention is characterized by the characterizing features of the first independent apparatus claim.

The elevator car according to the invention is characterized by the characterizing features of the second independent apparatus claim.

The method to according the invention is characterized by the characterizing features of the independent method claim.

An idea of the disclosed solution is that the apron device of an elevator comprises a first protective element and a second protective element, which are both vertically orientated. The first protective element is located normally at a distance from a bottom of an elevator car. The second protective element is located above the first protective element. The first and second protective elements are mounted movably in relation to the bottom of the elevator car so that they can move in upward direction when the first protective element contacts a bottom of a pit or any other obstacle or element which is located at a bottom part of an elevator shaft. The first and second protective elements are made of rigid material whereby they have bending stiffness. Further, the first protective element comprises one or more vertical first supports for supporting the first protective element vertically movably to the elevator car. The vertical supports allow the first protective element to move only in vertical direction. The first protective element moves the second protective element whereby the elements move together in upward direction. The second protective element moves at least partly in transverse direction in response to upward directed vertical movement of the first protective element.

In other words, the vertical movement of the first protective element is configured to move the second protective element from its vertical active position to inactive, or partly inactive, transverse position. Relative movement between the first protective element and the elevator car occur when the first protective element becomes in contact with the bottom of the pit of the elevator shaft or other obstacle while the elevator car continues its downward movement.

Operation principle of the disclosed apron is of type normally active since the apron device is in its extended position during the normal operation and moves to inactive state only when the elevator car is driven to its lowermost position where the apron device faces a pit.

The apron device may be sometimes called also as a platform guard, toe guard, or car skirt.

An advantage of the disclosed solution is that the structure of the apron device is provided with proper rigidity so that safety regulations are met. A further advantage is that the disclosed apron device can provide the elevator car with a relatively long skirt at a side of a door opening, and this sufficiently downwards extending skirt can prevent injuries effectively.

Further, the disclosed solution can be implemented in operationally and structurally different elevators.

According to an embodiment, the apron device is configured to provide protection also in a so called UCM-situation (Un-Controlled-Movement) wherein the elevator car moves upwards in an uncontrolled manner. Since the disclosed apron device is normally in its extended orientation, the apron can prevent people to fall into the shaft in situations when the door of the elevator car is open, and the car sill is moved above the landing. This way injuries caused by uncontrolled upward movements of the elevator car can be prevented.

According to an embodiment, the disclosed apron device can serve also as a toe guard or toe protector preventing damages in situations when the elevator car is stopped above a landing, door is open, and the elevator car moves downwards for some reason. Then the apron device prevents toes or legs entering to a dangerous gap formed between the landing and a bottom of the elevator car. This way injuries caused by uncontrolled downward movements of the elevator car can be prevented.

According to an embodiment, the apron device forms a movable skirt which extends below the door of the elevator car and which is configured to automatically vary its own extension relative to the elevator car. Thus, the apron device can reduce its own extension relative to the elevator car by contact with a floor of a pit of the elevator when the elevator car is at the lowest landing of the elevator. Further, the apron device may resume its own regular extension in relation to the elevator car by force of gravity, when the elevator car moves upwards, and the apron device is no longer in contact with the floor or base of the pit. Thus, the apron device may comprise a self-extract and-retract feature.

According to an embodiment, the apron device extends vertically at least 750 mm when being fully extended.

According to an embodiment, the second protective element has a sliced configuration comprising several horizontal slats connected to each other by means of joints allowing relative turning movement between the slats. In other words, when the first protective element moves upwards in relation to the bottom of the elevator car, then the sliced second protective element can bend, and its movement direction turns into transverse direction and the upper most end closest to the elevator car slides below the bottom of the elevator car.

According to an embodiment, the second protective element comprises at least 4 slats, typically 4-10 slats.

According to an embodiment, the mentioned joints between the slats are horizontal hinges. Turning axis of the hinges are horizontal.

According to an embodiment, the mentioned joints between the slats are bendable sections. Then the slats may be connected to each other by means of bendable elements, structures, or materials.

According to an embodiment, the second protective element may be arranged to move entirely below the bottom of the elevator car, or alternatively, only a portion closest to the elevator car is arranged to move below the bottom the elevator car.

According to an embodiment, in an alternative solution the second protective element comprises only one slat, which is arranged to turn below the bottom of the elevator car partly or entirely. In this case too, the lower first protective element is arranged to move the second protective element above it.

According to an embodiment, the apron device comprises guide surfaces for guiding the second protective element from vertical position to transverse position under the bottom of the elevator car.

According to an embodiment, the guide surfaces comprise at least one curved guide piece arranged between at least one vertical guide piece and at least one transverse guide piece for guiding the second protective element smoothly from the vertical orientation to transverse orientation and back.

According to an embodiment, the guide surfaces are arranged at both vertical end portions of the second protective element.

According to an embodiment, the guide surfaces may be formed of profile elements having substantially U-shaped cross sections. Then the second protective element may be mounted between arms of the U-shaped profile.

According to an embodiment, the first vertical supports of the first protective element may be bars which are connected to the bottom part of the elevator car by means of slide connection elements allowing the bars to move vertically in relation to the mentioned bottom part. Number of the bars may be two and they may be mounted at opposite ends of the first protective element so that the bars are free to extend above floor of the elevator car at both sides of a door opening. The bars can prevent the first protective element from moving laterally towards the elevator shaft and may thereby provide the arrangement with required rigidity and safety. An advantage of this embodiment is that the bars and their slide joints are relatively simple whereby the structure may be durable, maintenance free, and inexpensive.

According to an embodiment, the first vertical supports of the first protective element may be telescopic elements which can retract so that their extension can change when the first protective element moves vertically.

According to an embodiment, the apron device comprises a reeling device for reeling the second protective element at least partly under the elevator car.

According to an embodiment, the second protective element may be at first guided under the bottom of the elevator car and may be after that reeled. Alternatively, the reeling device may be configured to reel the second protective element directly without first executing any guiding below the elevator car.

According to an embodiment, the reeling device is located under a door sill of the elevator car.

According to an embodiment, the apron device comprises at least one return spring for ensuring return movement of at least the second protective element from the inactive position to the vertical active position.

According to an embodiment, the return spring can be also called as a pullback spring, release spring, restoring spring, or retracting spring.

According to an embodiment, the return spring may be a helical spring, for example. Alternatively, any other mechanical spring element, such as a spiral spring, can be used. It is also possible to implement gas springs as return spring elements. When the apron device comprises a reeling device, then the reeling device may comprise return springs for rotating the reeled second protection element back. Thus, the reeling device may be spring loaded.

According to an embodiment, the apron device may also comprise at least one return spring for ensuring vertical return movement of the first protective element from the vertical upper position to the vertical lower position.

According to an embodiment, the second protective element is configured to return from the inactive position to the active position under influence of gravity.

According to an embodiment, the second protective element is movable manually between the inactive position and the active position. Then rescue or service personnel can move the second protective element to suitable position.

According to an embodiment, the first protective element is configured to move from the vertical upper position to the vertical lower position under influence of gravity.

According to an embodiment, the first and second protective elements are connected mechanically to each other and are thereby configured to move together also in the return direction.

According to an embodiment, the first and second protective elements are movable separately in the return direction. Thus, the first and second protective elements are not coupled mechanically to each other but are separate elements.

According to an embodiment, the first protective element is a rigid one piece plate-like element having vertical orientation and movement path. An advantage of this embodiment is that the first protective element is durable and tolerates well contacts with the pit. Further, the structure is simple, inexpensive to manufacture and requires no maintenance.

According to an embodiment, the first protective element comprises a first component and a second component which are configured to slide vertically in relation to each other, whereby vertical dimension of the first protective element is dependent on relative positions of the mentioned first and second components. In other words, the first protective element has collapsible configuration comprising two or more components which are connected to each other slidably. An advantage of this embodiment is that vertical extension of the first protective element can be increased.

According to an embodiment, the apron may be a kind of hybrid solution comprising a lamella element with several slats as the second protective element, and a collapsible plate structure with two sliding components as the first protective element.

According to an embodiment, the first protective element comprises two vertical first supports, which are fixedly mounted at opposite end portions of the first protective element. Further, first the supports are supportable movably to the elevator car and at least vertical upper end portions of the first supports are allowed to move above the bottom of the elevator car. In other words, the first supports provide the first protective element hanging support and they move vertically together with the first protective element so that upper end portions may rise above the bottom of the elevator car. Since the first supports are located at horizontal ends of the first protective element, the upwards rising parts move next to a door opening and do not form any obstacle at the door opening of the elevator car.

According to an embodiment, the first supports of the first protective element are supported to a door sill of the elevator car by means of a coupling which allows vertical sliding of the first supports.

According to an embodiment, the first and second protective elements are made of metallic material. Thus, the structures of the first and second protective elements have sufficient bending stiffness. The bending stiffness of the beam is also known as the flexural rigidity of the beam i.e., ability to resist bending forces.

According to an embodiment, the first and second protective elements are made of steel.

According to an embodiment, the first and second protective elements are made of metallic sheet material by means of sheet metal work techniques, which may comprise cutting and bending, for example.

According to an embodiment, at least one of the first and second protective elements is made of composite material, such as fiber reinforced plastic material, having required bending stiffness.

According to an embodiment, the disclosed solution relates to an elevator car of a traction elevator. The elevator car is suspended from a suspension rope and is supported to walls of an elevator shaft by means of vertical guide rails. The elevator is movable vertically between several landings. The elevator car comprises at least one door opening and a bottom of the elevator car. Further, there is also at least one apron device which is located at the at least one door opening and is configured to prevent falling into the elevator shaft when there is a gap between the bottom and the landing. The apron device is in accordance with the features disclosed in this document.

According to an embodiment, the bottom of the elevator car comprises an openable service hatch. The hatch is possible since only part of the second protective element moves below the bottom. In the solution, where the second protective element is reeled, there is even more space below the bottom of the elevator car.

According to an embodiment, the bottom of the elevator car comprises a fastening point for a compensation element, such as a compensation chain or wire. Below the elevator car is plenty of free fastening points for the compensation elements since the second protective element takes only little or none space below the elevator car.

According to an embodiment, the elevator car is intended for a low pit elevator wherein there is only a low space below the elevator car when it is driven to the lowermost landing.

According to an embodiment, depth of the mentioned pit is 400 mm or less.

According to an embodiment, the elevator car is intended for a personnel elevator of a building.

According to an embodiment, the disclosed solution relates also to a method of protecting from falling into an elevator shaft. The method comprises: providing an elevator car with an apron device below an elevator car wherein the apron device comprises a first protective element and a second protective element both made of bending stiff rigid material and being orientated vertically; arranging the first protective element at a vertical distance from a bottom of an elevator car in the elevator shaft and arranging the second protective element above the first protective element; and retracting full vertical extension of the apron device in response to situation wherein the elevator car moves to its lowermost movement position and the first protective element becomes in contact with immovable structures of the elevator shaft. The method further comprises: hanging the first protective element below the second protective element and supporting the first protective element to the elevator car by means of at least one first first support; vertical moving the first protective element only in vertical direction in relation to the bottom of the elevator car; lifting the second protective element by the vertical movement of the first protective element; and moving at least part of the second protective element in transverse direction in response to upward directed vertical movement of the first protective element.

According to an embodiment, the method comprises guiding at least a top part of the second protective element below the bottom of the elevator car when the first protective element strikes bottom of a pit of the elevator shaft and lifts upwards in relation to the downwardly moving elevator car.

According to an embodiment, the method comprises guiding the second protective element entirely in transversal direction below the bottom of the elevator car.

According to an embodiment, the method comprises reeling the second protective element by means of a reeling device which is located under a door sill or under a bottom of the elevator car.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
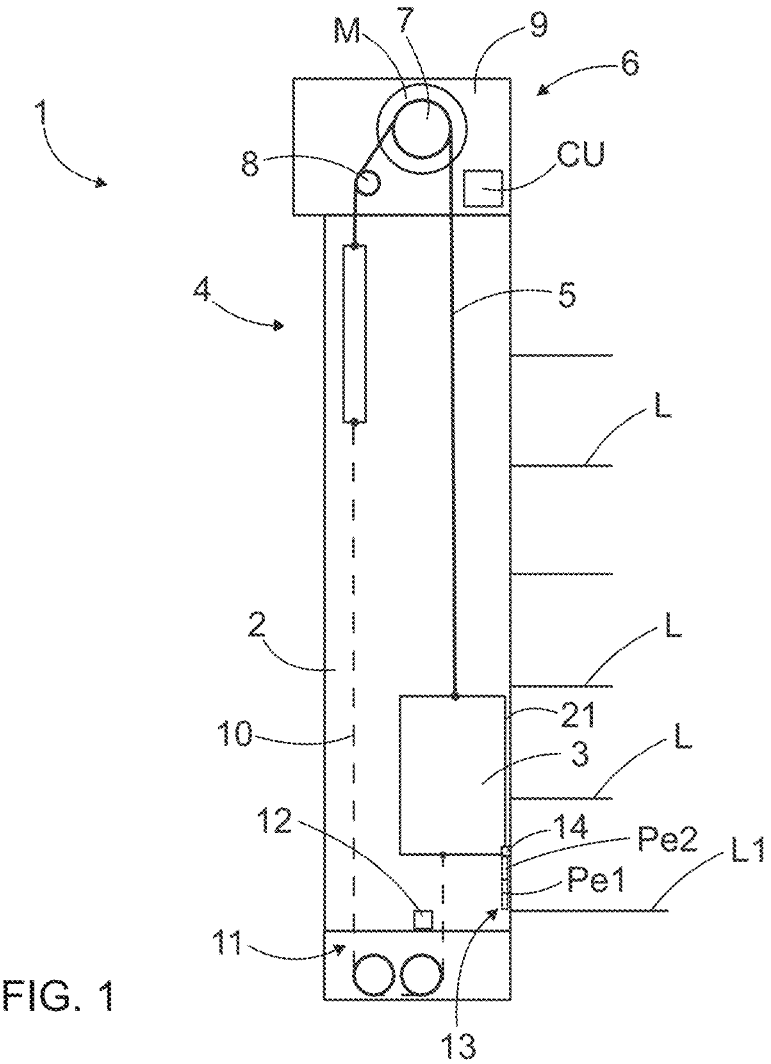
FIG. 1 is a schematic and highly simplified side view of a traction elevator.

FIG. 1 discloses a traction elevator 1 mounted to an elevator shaft 2 of a building. The elevator 1 comprises an elevator car 3 for receiving load to be transported. The car 3 and a counterweight assembly 4 are suspended from a suspension rope 5 passing via a hoisting machinery 6. The hoisting machinery 6 comprises a traction sheave 7 driven by means of an electric motor M. Between the suspension rope 5 and the traction sheave 7 occurs friction which is utilized for transmitting lifting power to the elevator system. The hoisting machinery 6 may comprise one or more additional pulleys 8 for guiding and controlling the suspension rope 5. The hoisting machinery 6 may be located at an upper machine room 9, or alternatively the system may be a so called machine room less elevator. A compensation chain or rope 10 may be connected between the counterweight assembly 4 and a bottom of the elevator car 3.

The elevator car 3 can be driven to desired landings L or floors under control of one or more control units CU. Below a first or lowermost landing there may be a pit 11 of an elevator shaft 2. There may be buffers 12 in the elevator shaft below the first landing L1. Further, the elevator car 3 is provided with an apron device 13 below its bottom. The apron device 13 is located at an entrance side of the elevator car 3 where is a door opening 21. The apron device 13 comprises at least one first protective element Pe1 and above it is at least one second protective element Pe2. The protective elements Pe1, Pe2 extend vertically below the bottom of the elevator car 3 or a door sill 14. If the elevator car 3 is stopped to a position shown in FIG. 1, then the apron device 13 closes uncontrolled entry to the elevator shaft 2.

The apron device 2 is in accordance with the embodiments and features disclosed in this document.

Figure 2:
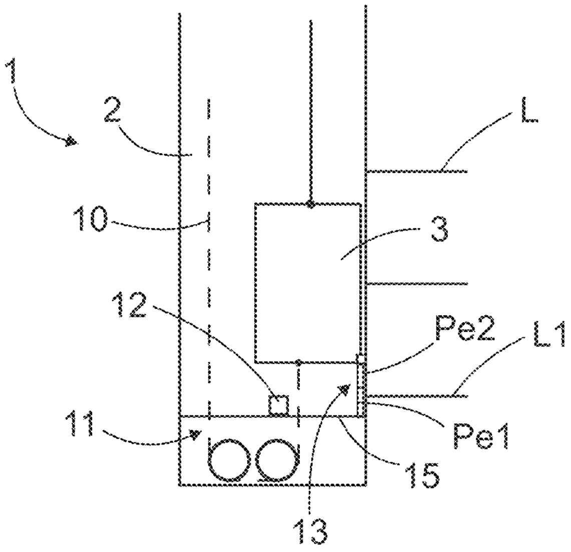
FIGS. 2 and 3 are schematic side views of a lower part of an elevator car and its apron device in two different vertical positions.

In FIG. 2 the elevator car 3 has moved vertically towards the pit 11 and the first protective element has then become in contact with a bottom 15 of the shaft 2 or any other fixed structure located at vertical movement path of the apron device 13. When the vertical downward movement of the elevator car 3 is continued, then the apron device 13 moves vertically upwards in relation to the elevator car 3.

Figure 3:
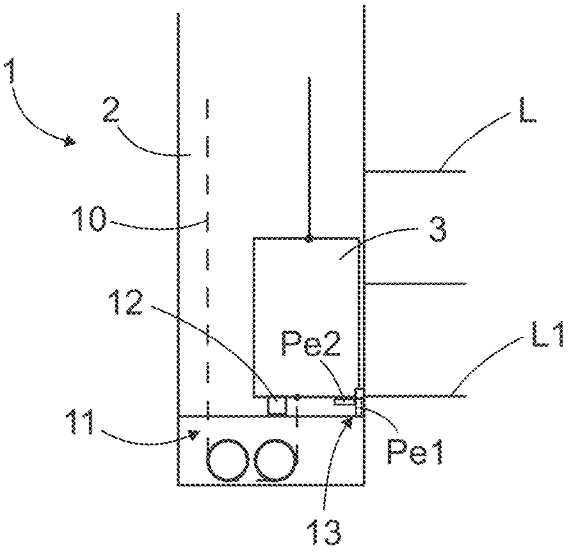

In FIG. 3 the vertical downward movement is stopped and the elevator car 3 has reached its lowermost position. The elevator car 3 is positioned at the first landing L1. Then the second protective element Pe2 is lifted by means of the upwards raised first protective element Pe1 and is guided below the bottom of the elevator car 3. This way vertical dimensions of the apron device 13 are decreased automatically by means of the vertical movement of the elevator car 3.

Figure 4:
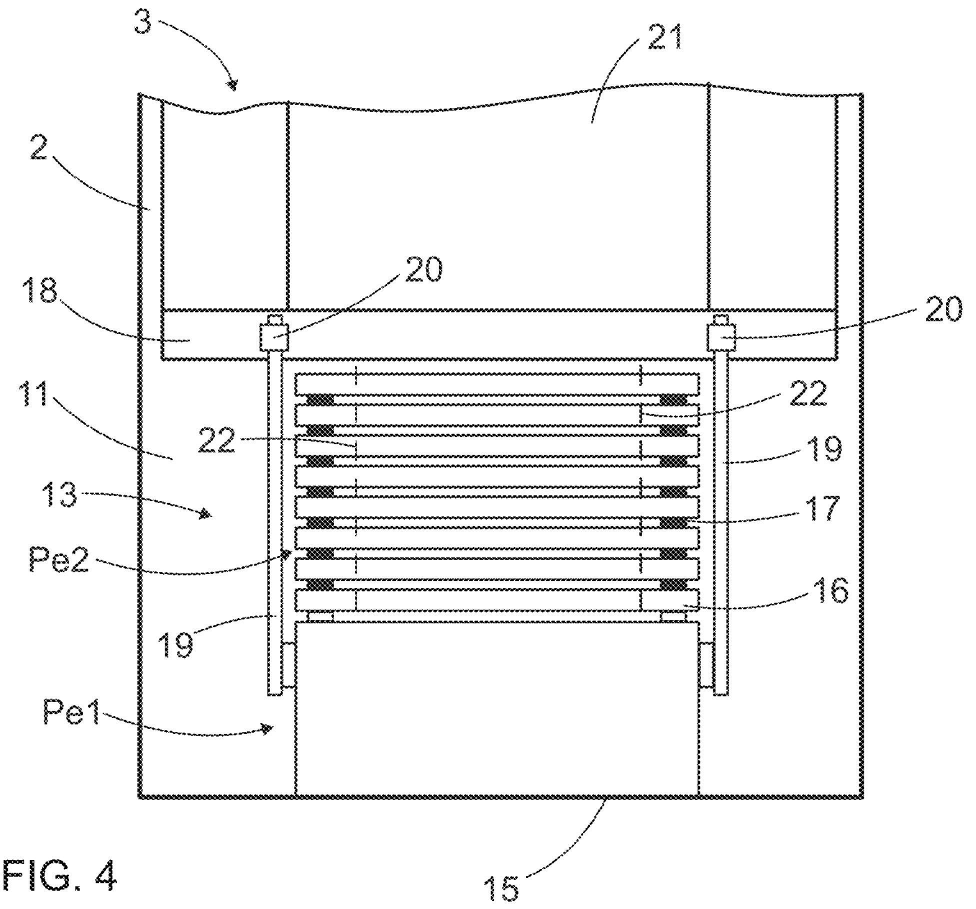
FIG. 4 is a schematic side view of an apron device comprising several slats and being in fully extended state.

FIG. 4 discloses an apron device 13 which has a second protective element Pe2 with sliced configuration and thereby comprises several horizontal slats 16 connected to each other by means of joints 17 allowing relative turning movement between the slats 16. The joints 17 may be hinges with horizontal turning axis, for example. The structure comprising several slats 16 and joints 17 between them is easily bendable and can be moved not only in vertical direction but also be turned in controlled manner in horizontal direction or in any desired transverse direction. Both protective elements Pe1 and Pe2 are in their fully extended state below a bottom 18 of an elevator car 3. The first protective element Pe1 may be a rectangular plate-like element which is supported to the bottom 18 by means of two vertical first supports 19, which are fixedly mounted at opposite end portions of the first protective element Pe1. The first supports 19 may be bars which are supported movably to the bottom 18 so that at least their vertical upper end portions can move above the bottom 18. The bottom 18 may be provided with coupling elements 20 which allow the first supports 19 to slide vertically. The coupling elements 20 may be arranged so that they are at a side of a door opening 21 of the elevator car 3, whereby the upwards rising first supports 19 move at the side of the door opening 21 and do not form any barrier for passengers. A top surface of the first protective element Pe1 lifts the second protective element Pe2 when a bottom surface of the first protective element Pe1 meets a bottom 15 of a pit 11 and when the elevator car 3 continues its movement downward. Thus, the apron device 13 forms a retractable skirt below the bottom 18 at the door opening 21 of the elevator car 3 and thereby serves as a safety device which allows the use of the pit 11 with low depth.

Figure 5:
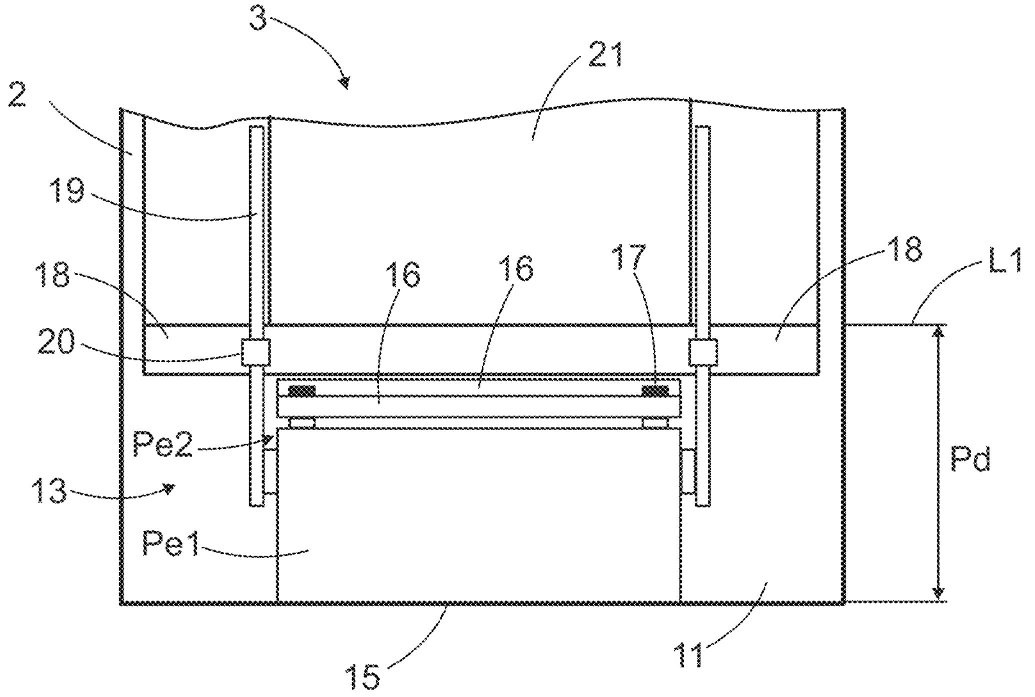
FIG. 5 is a schematic side view of the apron device of FIG. 4 seen in fully retracted state wherein a second protective element is moved transversally below an elevator car.

In FIG. 5 the apron device 13 of FIG. 4 is in fully retracted state wherein the second protective element Pe2 is moved transversally below the bottom 18 of the elevator car 3. Further, the first protective element Pe1 is in its retracted stated, wherein the bottom 18 of the elevator car 3 is moved towards the top surface of the first protective element Pe1. Then only relatively low pit depth Pd is needed below a lowermost first landing L1 and the bottom 15 of the pit 11.

The first protective element Pe1 is in FIGS. 4 and 5 a rigid one piece plate-like element having vertical orientation and movement path. The first protective element Pe1 may be provided with proper transverse support by means of the first supports 19. However, there may or may not be additional retractable support element for further supporting it.

The second protective element Pe2 may be coupled to a top part of the first protective element Pe1 whereby it may also be provided with support against transverse force by means of the first supports 19 of the first protective element Pe1. Alternative of in addition to, end portions of the horizontal the slats 16 may be supported to the first supports 19 for providing transverse rigidity for the structure. Furthermore, it may alternatively be possible to arrange retractable or movable second supports 22 for the second protective element Pe2. These second supports 22 are shown in FIG. 4 in a highly simplified manner.

Figure 6:
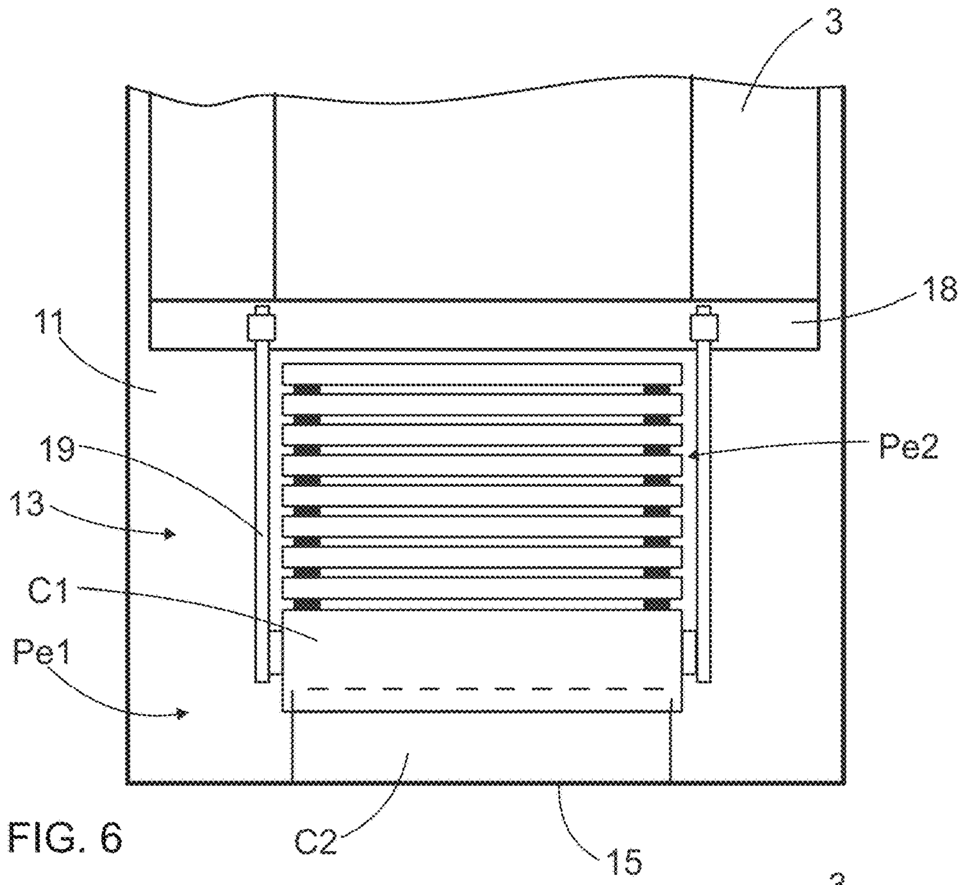
FIG. 6 is a schematic side view of an apron device wherein a lower first protective element has telescopic configuration so that its vertical dimensions can change.

FIG. 6 discloses an apron device 13 wherein a first protective element Pe1 has telescopic configuration so that its vertical dimensions can change, and it has an extended state and retracted state. The first protective element may comprise a first component C1 and a second component C2 which are configured to slide vertically in relation to each other. Thereby vertical dimension of the first protective element Pe1 is dependent on relative positions of the mentioned first and second components C1 and C2. The second component C2 may be a movable component which slide relative to the first component C1 being connected to first supports 19.

Figure 7:
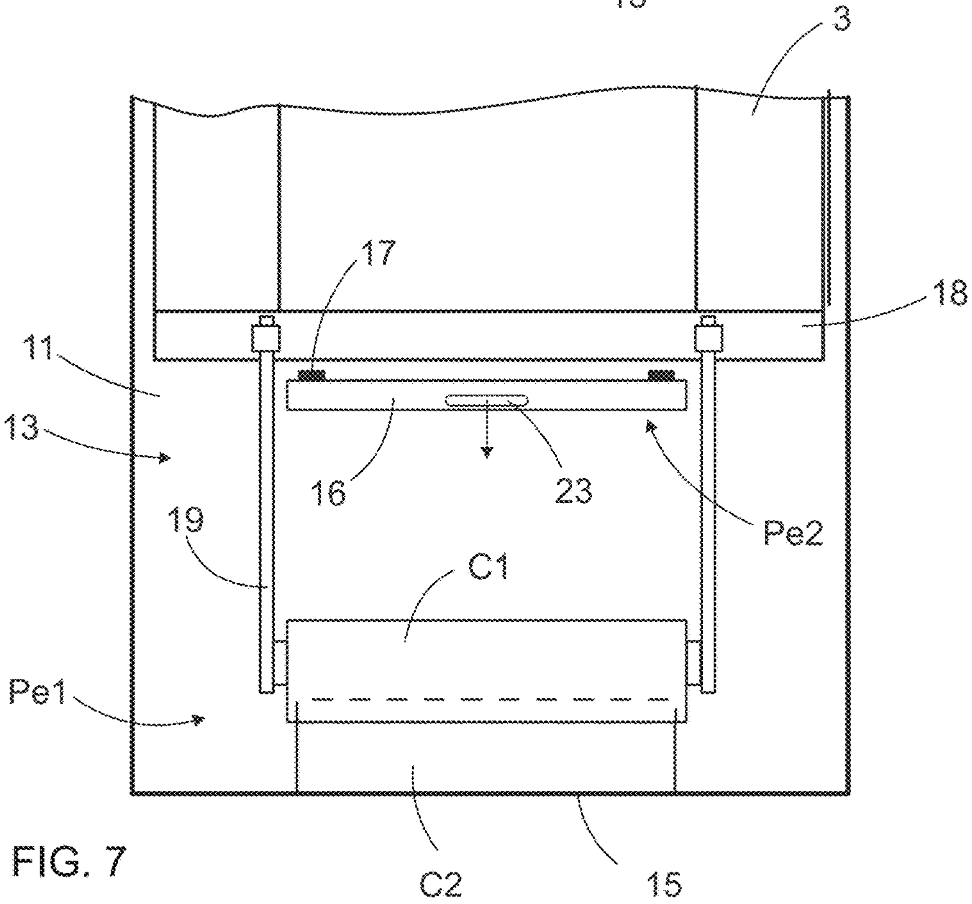
FIG. 7 is a schematic side view of an apron device wherein a lower protective element is extended, and an upper protective element is retracted.

FIG. 7 discloses an apron device 13 in a situation wherein a first protective element Pe1 is extended and a second protective element Pe2 is retracted. Thus, the first and second protective element Pe1, Pe2 are not mounted to each other whereby their downward movement may be executed individually. Upward movement occurs simultaneously since top surface of the first protective element transmits the retracting movement for the second protective element Pe2 also in this solution. The first protective element Pe1 can be extended under influence of gravity. In case the second protective element Pe2 is not provided with any retracting actuator, such as returning springs, then it stays in the retracted state when the elevator car 3 again moves upwards. The second protective element Pe2 may be provided with a grip 23 for moving it manually to the extended state. This way rescue personnel may move the second protective element when needed.

Figure 8:
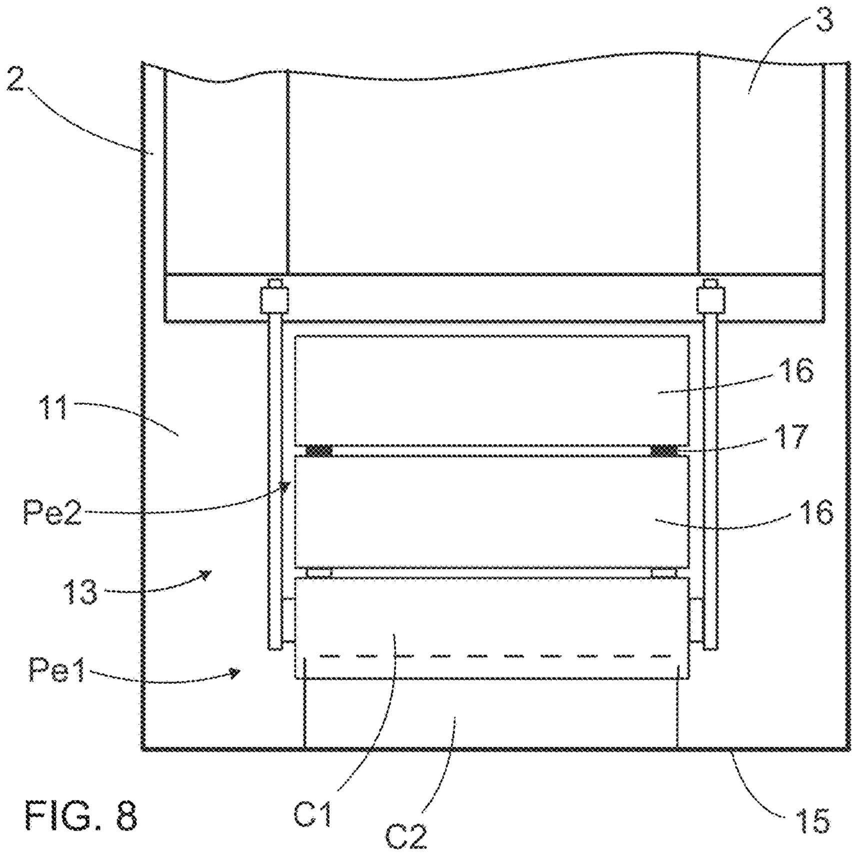
FIG. 8 is a schematic side view of an apron device wherein an upper protective element has two part hinged structure and a lower protective element comprises a telescopic structure.

FIG. 8 discloses an apron device 13 which differs from the one shown in FIG. 7 in that a second protective element Pe2 has two part hinged structure.

Figure 9:
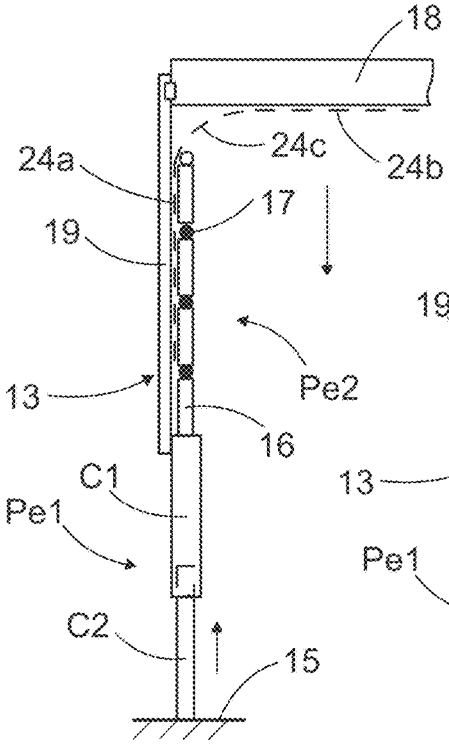
FIGS. 9-11 are schematic side view of an apron device in its different operational positions.
Figure 10:
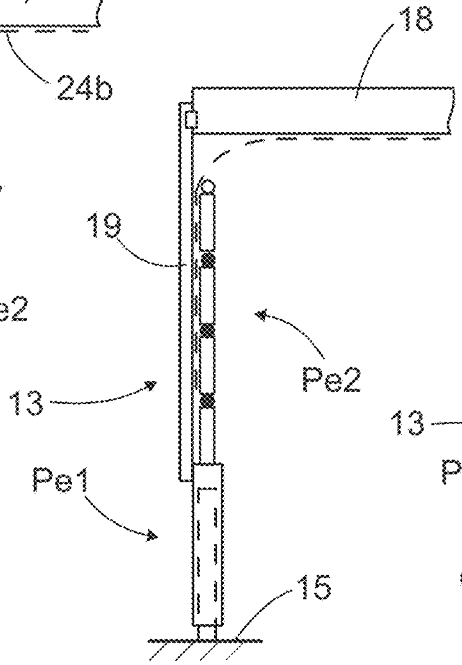
Figure 11:
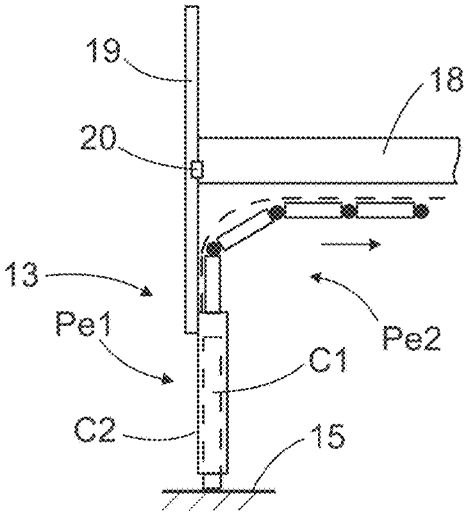

FIGS. 9-11 disclose how an apron device 13 and it first protective element Pe1 and second protective element Pe2 move from a fully extended state to fully retracted state. The second protective element Pe2 can be supported by means of support elements comprising vertical supports 24*a*, transverse elements 24*b* and curved element 24*c* between them. When the second protective element Pe2 moves upwards, then the curved element 24*c* can turn its upper part in transverse direction, as it is shown in FIG. 11. Other component and operation principle have already been disclosed above in this document.

Figure 12:
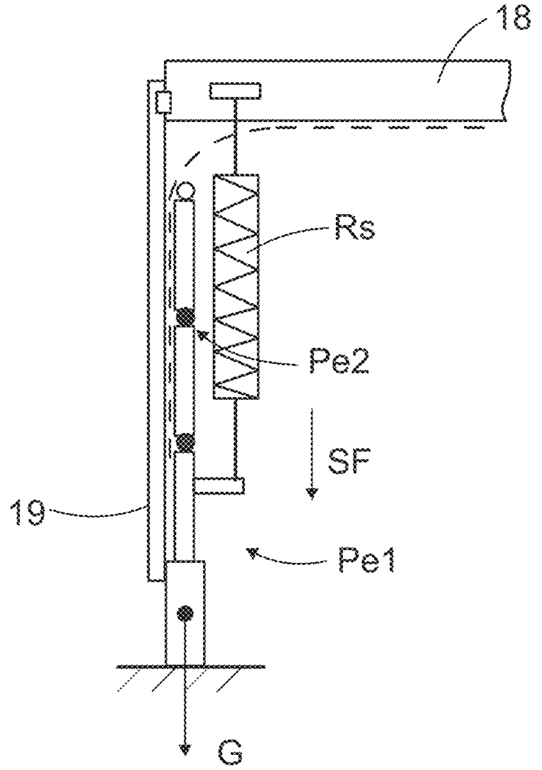
FIG. 12 is a schematic side view of an apron device comprising a return spring arrangement.

FIG. 12 discloses an apron device 13 comprising a returning arrangement for ensuring return movement of at least a second protective element Pe2 from its inactive transverse position to a vertical active position. The arrangement may comprise one or return springs Rs for generating needed spring force SF. A first protective element Pe1 may be extend by means of gravity G since it has only vertical movement path.

Figure 13:
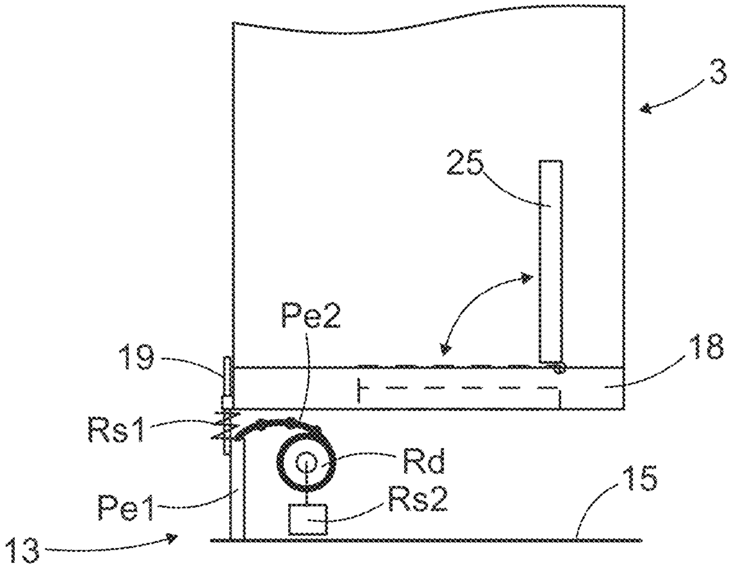
FIG. 13 is a schematic side view of an apron device comprising a reeling device for receiving an upper protective element in transverse direction.

FIG. 13 discloses an apron device 13 comprising a reeling device Rd for receiving a second protective element Pe2 in transverse direction when being retracted. The reeling device Rd may reel the second protective element Pe2 and may be provided with a second return spring Re2 for moving it back to an extended state. Further, a first protective element Pe1 may or may not be provided with a first return spring Rsl for moving it vertically downwards and extending it together with the gravity force.

FIG. 13 further discloses that a bottom 18 of an elevator car 3 may comprise an openable hatch 25 through which maintenance operations can be executed. The hatch 25 is possible because the disclosed apron device 13 needs only limited amount of space below the bottom 18.

It should be noted that the type and operating principle of the elevator 1 may be different from the one shown in FIGS. 1-3 only as an example.

Implementation of the disclosed solution is not limited to the exemplary elevator disclosed in the Figures. The arrangement and method can be used when providing any type of elevator with an apron device e.g., an elevator comprising a machine room or lacking a machine room, an elevator comprising or a a counterweight lacking counterweight.

Thus, the disclosed solution can be implemented in a versatile manner and especially in buildings with low pit.

The drawings and the related description are only intended to illustrate the idea of the invention. In its details, the invention may vary within the scope of the claims.

The invention claimed is:

1. An apron device of an elevator for preventing falling into an elevator shaft;

wherein the apron device comprises a first protective element and a second protective element, which are both vertically orientated;

the first protective element is mountable at a distance from a bottom of an elevator car;

the second protective element is located above the first protective element;

the first and second protective elements are mountable movably in relation to the bottom of the elevator car;

and the first and second protective elements are made of rigid material and are thereby provided with bending stiffness;

wherein the first protective element comprises at least one vertical first support for supporting the first protective element vertically movably to the elevator car;

the first protective element is configured to move only in vertical direction together with the mentioned vertical first support;

and wherein at least part of the second protective element is configured to move in transverse direction in response to upward directed vertical movement of the first protective element.

2. The apron device as claimed in claim 1, wherein the second protective element has a sliced configuration comprising several horizontal slats connected to each other by means of joints allowing relative turning movement between the slats.

3. The apron device as claimed in claim 1, wherein the apron device comprises guide surfaces for guiding the second protective element from vertical position to transverse position under the bottom of the elevator car.

4. The apron device as claimed in claim 1, wherein the apron device comprises a reeling device for reeling the second protective element at least partly under the elevator car.

5. The apron device as claimed in claim 1, wherein the apron device comprises at least one return spring for ensuring return movement of at least the second protective element from the inactive position to the vertical active position.

6. The apron device as claimed in claim 1, wherein the first protective element is a rigid one piece plate-like element having vertical orientation and movement path.

7. The apron device as claimed in claim 1, wherein the first protective element comprises a first component and a second component which are configured to slide vertically in relation to each other, whereby vertical dimension of the first protective element is dependent on relative positions of the mentioned first and second components.

8. The apron device as claimed in claim 1, wherein the first protective element comprises two vertical first supports, which are fixedly mounted at opposite end portions of the first protective element; and the first supports are supportable movably to the elevator car and at least vertical upper end portions of the first supports are allowed to move above the bottom of the elevator car.

9. The apron device as claimed in claim 1, wherein the first and second protective elements are made of metallic material.

10. An elevator car of a traction elevator, wherein the elevator car is suspended from suspension rope, is supported to walls of an elevator shaft and is movable vertically between several landings;

and the elevator car comprises:

at least one door opening;

a bottom;

at least one apron device which is located at the at least one door opening and is configured to prevent falling into the elevator shaft when there is a gap between the bottom and the landing;

wherein the apron device is in accordance with claim 1.

11. A method of protecting from falling into an elevator shaft;

the method comprising:

providing an elevator car with an apron device below an elevator car wherein the apron device comprises a first protective element and a second protective element both made of bending stiff rigid material and being orientated vertically;

arranging the first protective element at a vertical distance from a bottom of an elevator car in the elevator shaft and arranging the second protective element above the first protective element;

and retracting full vertical extension of the apron device in response to situation wherein the elevator car moves to its lowermost movement position and the first protective element becomes in contact with immovable structures at the elevator shaft;

characterized by hanging the first protective element below the second protective element and supporting the first protective element to the elevator car by means of at least one first vertical first support;

moving the first protective element only in vertical direction in relation to the bottom of the elevator car;

lifting the second protective element by the vertical movement of the first protective element; and moving at least part of the second protective element in transverse direction in response to upward directed vertical movement of the first protective element.

12. The method as claimed in claim 11, characterized by guiding at least a top part of the second protective element below the bottom of the elevator car when the first protective element strikes a bottom of a pit of the elevator shaft and lifts upwards in relation to the downwardly moving elevator car.

13. The method as claimed in claim 11, characterized by reeling the second protective element by means of a reeling device which is located under a door sill or under a bottom of the elevator car.

14. The method as claimed in claim 11, characterized by providing the apron device with at least one return spring and moving the apron device to extended state after being retracted.

15. The method as claimed in claim 11, characterized by providing the second protective element with at least two elements and allowing them to be turned relative to each other when moving the second protective element to retracted position below a bottom of the elevator car.

* * * * *